3,157,707
METHOD OF REACTING TETRACHLOROETHYLENE, CHLORINE AND HYDROGEN FLUORIDE
Jared W. Clark, Charleston, and Joseph P. Henry and Charles E. Rectenwald, South Charleston, W. Va., assignors to Union Carbide Corporation, a corporation of New York
No Drawing. Filed Feb. 20, 1961, Ser. No. 90,187
3 Claims. (Cl. 260—653.7)

This invention relates to a method for producing perhaloethane compounds. In a particular aspect, this invention relates to a process for halogenating tetrachloroethylene by the use of improved chromium catalysts.

The process contemplated by the present invention comprises contacting a vapor phase mixture comprising tetrachloroethylene, chlorine and hydrogen fluoride with a chromium oxide ($Cr_2O_3$) catalyst at a temperature between 200 and 450° C. and recovering trichlorotrifluoroethane and dichlorotetrafluoroethane as major products. Pentachloromonofluoroethane, tetrachlorodifluoroethane and trichlorodifluoroethane are also produced in the process in quantities which depend on the particular reaction conditions employed.

The trichlorotrifluoroethane, dichlorottetrafluoroethane and tetrachlorodifluoroethane products each exist in two isomeric forms. The isomers 1,1,2-trichloro-1,2,2-trifluoroethane ($CCl_2F$—$CClF_2$), 1,2-dichloro-1,1,2,2-tetrafluoroethane ($CClF_2$—$CClF_2$) and 1,1,2,2-tetrachloro-1,2-difluoroethane ($CCl_2F$—$CCl_2F$), are predominantly produced. The isomers 1,1,1-trichloro-2,2,2-trifluoroethane ($CCl_3$—$CF_3$), 1,1 - dichloro - 1,2,2,2, - tetrafluoroethane ($CCl_2F$—$CF_3$) and 1,1,1,2-tetrachloro-2,2-difluoroethane ($CCl_3$—$CClF_2$), are produced in minor quantities.

The process can be conducted either batchwise or continuously. In a preferred method, the reaction mixture is passed as vapor continuously over chromium oxide catalyst contained in a stainless steel or nickel pipe reactor and the effluent product gas is processed through a water scrubber and a drying unit, and then the product mixture is condensed and recovered. The components of the product mixture are conveniently separated by distillation.

The process temperature can vary between 200° C. and 450° C., with the preferred temperature range being between about 300° C. and 400° C. The use of temperatures below about 200° C. results in low conversion and temperatures above about 450° C. promote carbon scission and reduce the active life of the catalyst.

The process can be performed at amospheric pressure or at subatmopheric pressure and superatmospheric pressure. Pressures above atmospheric pressure are particularly useful when it is desirable to recover anhydrous hydrogen fluoride and hydrogen chloride by distillation. Pressures up to 300 p.s.i.g. and higher can be advantageously employed.

The residence time of the feed mixture in the reaction zones varies widely depending on the reaction temperature employed, on the particular proportions of components in the feed mixture, and on the particular proportion of product components desired in the recovered product mixture. The residence time will range from as little as one second at the higher temperatures to as high as several minutes or more at the lower temperatures. In a typical reaction sequence, the residence time of the feed material in the reaction zone will vary between about one second and ten seconds at reaction temperatures between 200° and 400° C. A residence time between about two and five seconds at a temperature between 300 and 400° C. is particularly preferred.

The molar ratio of hydrogen fluoride and chlorine to halocarbon starting material in the feed mixture can be varied in the range between 1 and 10 moles of hydrogen fluoride, and 1 and 2 moles of chlorine, for each mole of halocarbon feed, with the preferred molar ratio being between 4 and 8 moles of hydrogen fluoride, and 1 and 1.5 moles of chlorine, per mole of halocarbon feed. The quantity of hydrogen fluoride required per mole of halocarbon feed material varies depending on the fluorine content of the products desired, and also on the number of chlorine atoms contained in the halocarbon feed material which can be exchanged with fluorine. The halocarbon feed material will be fluorine-containing when intermediate fluorination reaction products recovered from the process are recycled to the feed material, e.g., tetrachlorodifluoroethane.

The chromium fluorination catalyst can be employed in several forms. The catalyst can be in the form of granular hydrous chromium oxide which is recovered as a precipitate formed by the action of ammonium hydroxide on an aqueous chromium chloride solution or other aqueous solution of a water-soluble chromium salt such as chromium nitrate. The same hydrous chromium oxide can be employed in the form of cubes prepared from the precipitate when it is in the form of a partially dried paste. In another variation, the hydrous chromium oxide can be mixed with a minor portion of chromium chloride and pelleted. The chromium chloride in the mixture performs as a lubricant to facilitate the pelleting operation. In another variation, chromium chloride and aluminum chloride can be coprecipitated with ammonium hydroxide. The resulting precipitate can be used in the form of granules, cubes, or pellets as described above. In still another variation, the chromium oxide is employed on an alumina support. The preferred alumina-supported chromium oxide catalysts are those prepared in the following manner. Porous alumina is impregnated with an aqueous solution of chromium trioxide ($CrO_3$). The material is then dried and reduced at elevated temperatures in an atmosphere of hydrogen. The porous alumina employed can be either alpha-alumina, or the activated type such as chi-alumina, gamma-alumina, kappa-alumina, and the like. Chromium oxide catalysts are preferred in the practice of this invention. The alumina-supported chromium oxide catalysts are particularly outstanding.

To recover conveniently the product mixture produced by the process, the effluent gas is scrubbed with water, dried with a drying agent such as silica gel, or calcium chloride, and then the product mixture is condensed and recovered. The product mixture is fractionally distilled to separate the mixture into its components, and one or more product components can be recycled if desired. This process is easily adapted for commercial operation by the use of suitable refrigeration and compression systems to accomplish the required separation and recycling procedures.

In another aspect of the present invention, the process can be conducted in two reaction zones. Illustrative of this method, in a single reactor containing the chromium oxide halogenation catalyst, tetrachloroethylene and chlorine, in a molar ratio between about 1 and 2 moles of chlorine per mole of tetrachloroethylene, are entered in the vapor phase into one end of the reactor where the chromium oxide catalyst is contacted at a temperature between 200° C. and 350° C. in a first reaction zone for a contact time between about 1 and 10 seconds. The effluent product gas ensuing from the first reaction zone is mixed with hydrogen fluoride, said hydrogen fluoride being employed in a quantity between about 4 and 10 moles per mole of halocarbon material contained in the vapor mixture, and passed continuously into a second reaction zone where the chromium oxide catalyst is contacted at a temperature between about 300° C. and 400° C. for a residence time between 1 and 10 seconds. The gaseous product stream is recovered and separated into its components as previously described. This two-stage method of conducting the invention process has the advantage of reducing or eliminating entirely the production of pentahaloethanes when these particular products are not desired. The two-stage method is also advantageous in that the first-stage chlorination reaction can be conducted at a lower temperature and the heat of reaction therein produced raises the temperature of the effluent gas up to the higher temperatures which are practical and efficient for the second-stage fluorination reaction.

The chlorofluoroethane products produced by the process of the present invention are useful as solvents, refrigerants, aerosol propellants and as intermediates for resin monomers.

The following examples will serve to illustrate specific embodiments of the invention.

*Example 1*

This example illustrates the preparation of chromium catalysts useful in the practice of this invention.

(a) Water (1145 milliliters) and ammonium hydroxide (588 grams, 28 percent $NH_3$) were placed in a flask equipped with a mechanical stirrer and a dropping funnel. A chromic chloride solution (520 grams of a 37 percent chromic chloride solution and one liter of water) was added dropwise to the contents of the flask with stirring during a one-hour period. The resulting precipitate was separated from the supernatant liquid, and the precipitate was washed with water to remove ammonium chloride. The precipitate was then placed in a shallow pan and dried in a vacuum oven at 70° C. When the material was partially dried, the paste was cut into small squares so that the hydrous chromium oxide catalyst after complete drying was in the form of ¼-inch cubes. The final drying of the hydrous chromium oxide catalyst was accomplished at a temperature of 480° C. under an atmosphere of nitrogen.

(b) Approximately 600 milliliters (247 grams) of hydrous chromium oxide prepared in the manner of section (a) above was mixed with 45 grams of anhydrous chromic chloride, and the mixture was ground in a ball mill for sixteen hours. The fine powder obtained was pelleted employing 3/32-inch dies.

(c) Approximately 344 grams (2.5 moles) of aluminum chloride was dissolved in 1.5 liters of water. This solution was blended with a solution containing 395 grams (2.5 moles) of chromic chloride in 3.67 liters of water. The resulting solution was fed with vigorous agitation into a flask containing 920 grams of 28 percent ammonium hydroxide diluted with 4 liters of water. The resulting precipitate was separated and washed several times with water. The material was transferred to shallow pans, cut into ¼-inch cubes and dried in an oven at 60° C., and then dried in a furnace at 450° C. for two days.

(d) Approximately 67.1 grams of chromium trioxide ($CrO_3$) was dissolved in 102 grams of water. This solution was then added slowly with frequent agitation to 300 cubic centimeters of Alcoa F–10 activated alumina (gamma-form, 6–8 mesh) contained in an evacuated flask. The material was partially dried by heating the flask under reduced pressure. It was then transferred to a one-inch I.D. nickel reactor and heated to 200° C. under a constant flow of nitrogen to complete the drying of the catalyst. The orange-red catalyst was then reduced with hydrogen for four hours at 250° C. to 300° C. to produce the green-colored chromium oxide ($Cr_2O_3$) supported on gamma-alumina.

In a similar manner, a catalyst of chromium oxide supported on alpha-alumina was prepared. The alpha-alumina supported catalyst had the advantage of additional mechanical strength.

*Example 2*

The halogenation reaction was conducted in a one inch I.D. by forty-two inch nickel pipe reactor heated by means of a salt bath.

During a reaction period of three and one-half hours, tetrachloroethylene (496 grams), chlorine (380 grams) and hydrogen fluoride (486 grams) were vaporized and contacted with 300 milliliters of alumina-supported chromium oxide catalyst prepared in a manner similar to that described in Example 1, section (d), at a temperature ranging from 350° C. to 400° C. in the upper portion of the catalyst bed and 300° C. in the lower portion of the bed. The effluent product stream ensuing from the base of the reactor was passed through a water scrubber, a calcium chloride drying tower, and was collected in refrigerated traps. Distillation of the resulting condensate yielded the following compounds:

| Compound | Grams | Percent Yield |
|---|---|---|
| $C_2ClF_5$ | 20 | 4.3 |
| $C_2Cl_2F_4$ | 332 | 65 |
| $C_2Cl_3F_3$ | 151 | 27 |
| $C_2Cl_4F_2$ | 14 | 2.3 |
| $C_2HCl_3F_2$ | 0.4 | |
| $Cl_2$ | 155 | |

*Example 3*

Employing the same nickel pipe reactor as described in Example 2, tetrachloroethylene (500 grams) and chlorine (365 grams) during a reaction period of three and one-half hours were fed into the top of the reactor and hydrogen fluoride (558 grams) was introduced at a point seven and one-half inches below the top of the catalyst bed. The temperature in the top portion of the catalyst bed varied from 360° C. at the one inch level to 247° C. at the seven and one-half inch level. The temperature in the lower portion of the catalyst bed varied from 247° C. at the level that the hydrogen fluoride was introduced to 304° C. in the bottom portion. The volume of catalyst in the upper reaction zone was 100 milliliters and the volume was 200 milliliters in the lower reaction zone. Distillation of the resulting condensate yielded the following products:

| Compound | Grams | Percent Yield |
|---|---|---|
| $C_2Cl_2F_4$ | 36 | 7.0 |
| $C_2Cl_3F_3$ | 426 | 75.5 |
| $C_2Cl_4F_2$ | 106 | 17.3 |
| $C_2HCl_3F_2$ | 0.2 | |
| $Cl_2$ | 150 | |

What is claimed is:

1. A process which comprises contacting a vapor phase mixture comprising tetrachloroethylene, chlorine and hydrogen fluoride with a $Cr_2O_3$ catalyst at a temperature between 200° C. and 450° C. and recovering trichlorotrifluoroethane and dichlorotetrafluoroethane as products.

2. A process which comprises contacting a vapor phase mixture comprising tetrachloroethylene, chlorine and hydrogen fluoride with a $Cr_2O_3$ catalyst at a temperature between about 200° C. and 450° C. for a contact time between about 1 and 10 seconds, and recovering tetrachlorodifluoroethane, trichlorotrifluoroethane, dichlorotetrafluoroethane and chloropentafluoroethane as products.

3. A process which comprises contacting a vapor phase mixture comprising tetrachloroethylene and chlorine with $Cr_2O_3$ catalyst at a temperature between about 200° C. and 350° C. in a first reaction zone, mixing the effluent gas stream from the said first reaction zone with hydrogen fluoride and contacting the vapor mixture with chromium oxide catalyst at a temperature between about 300° C. and 400° C. in a second reaction zone, and recovering trichlorotrifluoroethane and dichlorotetrafluoroethane as products.

References Cited in the file of this patent

UNITED STATES PATENTS 2,714,618    Woolf _____ Aug. 2, 1955